United States Patent
Huang et al.

(10) Patent No.: US 6,291,916 B1
(45) Date of Patent: Sep. 18, 2001

(54) ROTOR BALANCE STRUCTURE

(75) Inventors: Wen-shi Huang; Kuo-cheng Lin; Ming-shi Tsai; Chu-hsien Chou, all of Taoyan (TW)

(73) Assignee: Delta Electronics Inc. (TW)

( * ) Notice: Subject to any disclaimer, the term of this patent is extended or adjusted under 35 U.S.C. 154(b) by 0 days.

(21) Appl. No.: 09/551,834

(22) Filed: Apr. 18, 2000

(30) Foreign Application Priority Data

Dec. 29, 1999 (TW) .............................................. 88123356 A

(51) Int. Cl.[7] .............................. H02K 15/16; H02K 7/09
(52) U.S. Cl. ............................. 310/90.5; 310/51; 310/261
(58) Field of Search ....................... 310/51, 90.5, 67 R, 310/89, 190, 191, 261, 266

(56) References Cited

U.S. PATENT DOCUMENTS

| | | | |
|---|---|---|---|
| 5,623,382 | * 4/1997 | Moritan et al. | 310/67 R |
| 5,659,445 | * 8/1997 | Yoshida et al. | 360/98.07 |
| 5,783,884 | * 7/1998 | Fujishima et al. | 310/90 |
| 5,994,803 | * 11/1999 | Jung | 310/51 |
| 6,100,618 | * 9/2000 | Schoeb et al. | 310/90.5 |

* cited by examiner

Primary Examiner—Burton S. Mullins

(57) ABSTRACT

A rotor balance structure, which comprises a vane shell, a rotor case installed on the inner side of the vane shell, and a magnet installed on the inner side of the rotor case. The rotor is coupled with a stator, which comprises a coil and a magnetic conduction silicon steel set. When the coil on the stator is provided with an electrical current and generates a magnetic field, the magnet is attracted through the magnetic conduction silicon steel set to rotate the rotor balance structure. The feature of the rotor balance structure of the present invention is in that a magnetically conductive plate is included and installed under the inner side of the vane shell top. The magnetically conductive plate does not have any magnetic conduction with the rotor case but has an attractive magnetic interaction with the coil so that the rotational balance of the rotor balance structure can be improved.

16 Claims, 2 Drawing Sheets

ROTOR BALANCE STRUCTURE

FIELD OF THE INVENTION

The present invention relates to a rotor balance structure and, in particular, to a rotor balance structure utilizing electromagnetic induction for the rotor to attain force balance in rotation.

BACKGROUND OF THE INVENTION

When the rotor of a motor rotates, the active force exerted by the air on the vane attached to the rotor or changes in the direction of the electromagnetic force exerted on the rotor can make the rotor fluctuate or vibrates up and down. This causes the problems of noises, worn-out parts, or the like.

Referring to FIG. 4 that is a schematic view showing a conventional combination of a rotor structure and a stator. The rotor structure comprises a rotor case 41, a magnet 3, and a vane shell 4. The vane shell is substantially in the shape of a cup, with a plurality of blades formed around its outer side. The rotor case 41 is also in the shape of a cup and provided on the inner side of the vane shell 4. The magnet 3 is installed within the rotor case 41. The stator comprises a coil 5 and a silicon steel set 6. The rotor is coupled to the bearing 8 in the stator by the shaft 7. When the coil 5 of the stator is energized by a current, magnetic force is generated via the silicon steel set 6 and the magnet 3 of the rotor to cause the rotor to rotate.

The rotor case 41 and the magnet 3 keep a saturation state of magnetic balance. The magnetic field generated by the coil 5 induces a magnetic force on the magnet 3, but essentially has no magnetic interaction with the top of the rotor case 41. In other words, the magnetic force generated by the coil 5 has little influence on the rotor in the longitudinal direction of the shaft 7. The fluctuation or vibration of the rotor usually has been alleviated by an elastic member, such as a C clasp, a spring, or the like. Yet this type of design can only keep the static balance of the rotor. When the rotor rotates, there are still problems such as noise and wear of the C clasp.

SUMMARY OF THE INVENTION

In view of the foregoing problems, it is an object of the present invention to provide a rotor balance structure that can alleviate the fluctuation and up-and-down vibration of the rotor during its rotation.

To achieve the above object, the rotor balance structure of the present invention comprises a vane shell, a rotor case installed on the inner side of said vane shell, and a magnet installed on the inner side of said rotor case. Said rotor balance structure is coupled with a stator comprising a coil and a magnetic conduction silicon steel set. When said coil is provided with an electrical current and generates a magnetic field, said magnet is attracted by said magnetic conduction silicon steel set so as to rotate the rotor balance structure. The feature of the rotor balance structure of the present invention is in that a magnetically conductive plate is included and installed under the inner side of the vane shell top. The magnetically conductive plate does not have any magnetic conduction with the rotor case but has an attractive magnetic interaction with the coil so that the rotational balance of the rotor balance structure can be improved.

According to an aspect of the present invention, there is no magnetic conduction between the magnetically conductive plate and the rotor case, so the magnetically conductive plate can have an increasing axial magnetic force on the coil so as to improve the rotational balance of the rotor. Thus, the situation of rotor floatation and vibration ups and downs while rotating can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects and advantages of the present invention will become apparent by reference to the following description and accompanying drawings wherein.

DETAILED DESCRIPTION OF THE PREFERRED EMBODIMENTS

Figure 1:
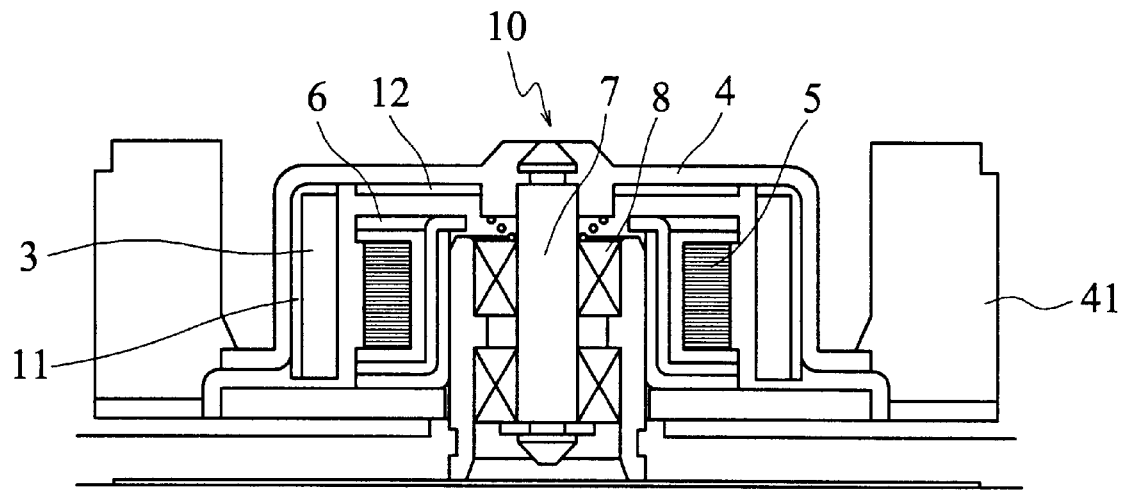
FIG. 1 is a schematic view showing the combination of a rotor balance structure and a stator in accordance with the first embodiment of the present invention.

Referring to FIG. 1, a rotor balance structure 10 comprises a rotor case 11, a magnetically conductive plate 12, a magnet 3, and a vane shell 4. The vane shell 4 is substantially in the shape of a cup and is circumferentially attached with a plurality of blades 41. The rotor case 11 is annular in shape and is mounted on the inner side of the vane shell 4 and the portion near the top of the vane shell 4 is slightly extended toward the central portion of the rotor balance structure. The magnet 3 is circumferentially mounted on the inner side of the rotor case 11. The magnetically conductive plate 12 is directly mounted on the inner side of the top of the vane shell 4 but not in contact with the rotor case 11. A stator comprises a coil 5 and a silicon steel set 6. In the rotor balance structure 10, a shaft 7 engages with a bearing 8 installed in the stator. When the coil 5 on the stator is energized by a current to generate a magnetic field, a magnetic interaction is generated between the silicon steel set 6 and the magnet 3 in the rotor balance structure 10 to bring the rotor into rotation.

Since the magnetically conductive plate 12 on the inner side of the top of the vane shell 4 is separate from the rotor case 11, it has an independent magnetic induction with the coil 5 on the stator. Compared with the rotor structure of the prior art in which the magnetic interaction in the axial direction of the shaft is very little due to that the entire rotor case and magnet is in a saturation state of magnetic balance, the magnetically conductive plate 12 can have a significant induction by the coil 5 and cause an axial magnetic force on the rotor.

The magnetically conductive plate 12 itself is not a magnet, so it always has an attractive force no matter in which orientation the magnetic field of the coil 5 is. By designing the shape of the magnetically conductive plate 12 so that it is symmetric to the shaft 7, the rotor balance structure 10 can experience axial force symmetric with respect to the shaft 7 and pointing toward the stator while rotating so as to keep the rotational balance of the rotor balance structure 10. Thereby when the rotor rotates, the noise and wear between moving parts can be reduced and the lifetime of both the rotor balance structure 10 and the stator can be elongated.

The magnetically conductive plate 12 can be made of any material that can be induced by the magnetic field of the coil 5 and create an attractive magnetic force, such as silicon steel or iron.

Figure 2:
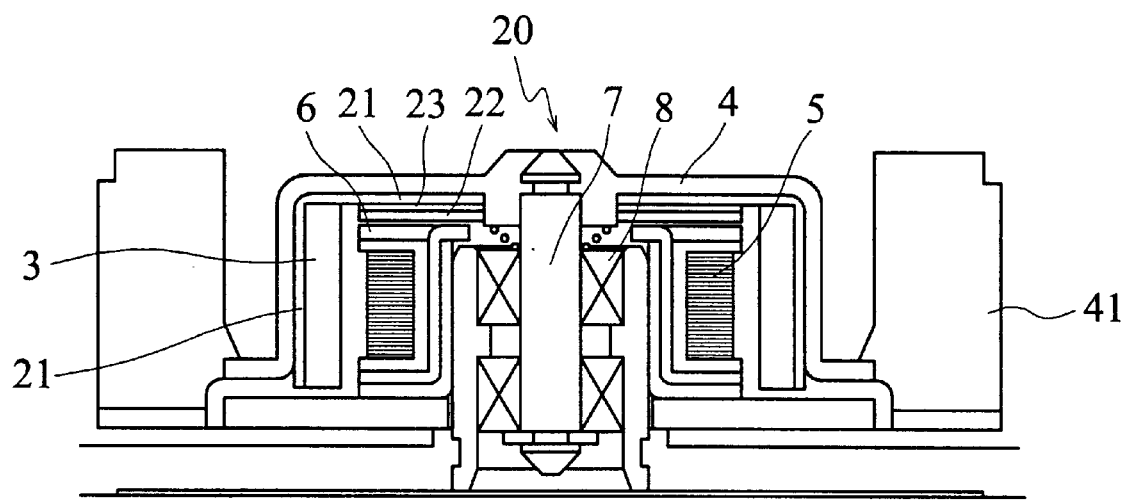
FIG. 2 is a schematic view showing the combination of a rotor balance structure and a stator in accordance with the second embodiment of the present invention.

FIG. 2 is a schematic view of a rotor balance structure 20 in accordance with the second embodiment of the present invention. The difference between FIG. 2 and FIG. 1 is in that the rotor case 21 is in the shape of a cup and the magnetically conductive plate 22 is mounted on the inner side of the top of the rotor case 21 with a layer of non-magnetically conductive material 23 inserted in between.

In this embodiment, a layer of non-magnetically conductive material 23 is inserted between the magnetically conductive plate 22 and the rotor case 21. The magnetically conductive plate 22 can be independently induced by the coil 5 so as to increase the magnetic force along the axial direction as in the first embodiment.

The magnetically conductive plate 22 can be made of any material that can be induced by the magnetic field of the coil 5 and create an attractive magnetic force, such as silicon steel or iron. The non-magnetically conductive material 23 can be made of, for example, rubber or plastic.

Figure 3:
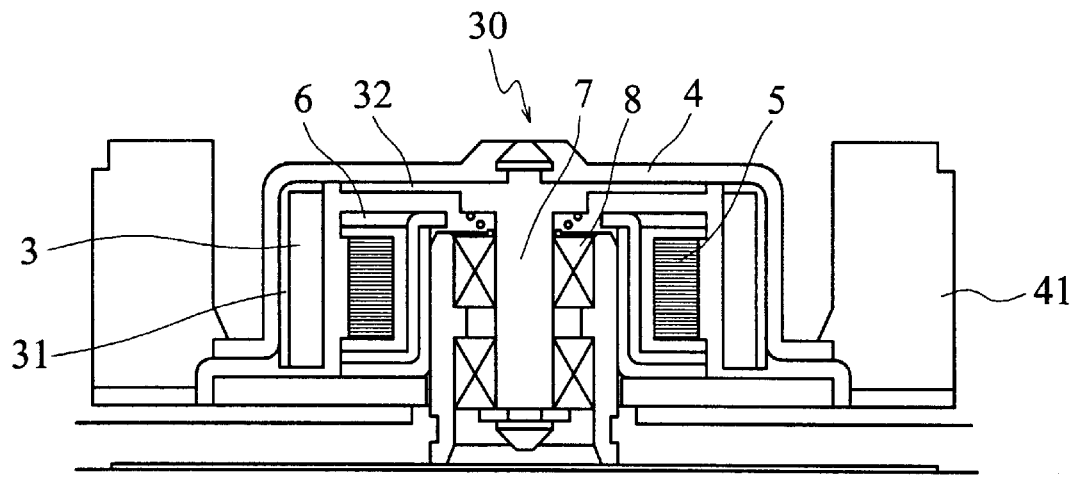
FIG. 3 is a schematic view showing the combination of a rotor balance structure and a stator in accordance with the third embodiment of the present invention.
Figure 4:
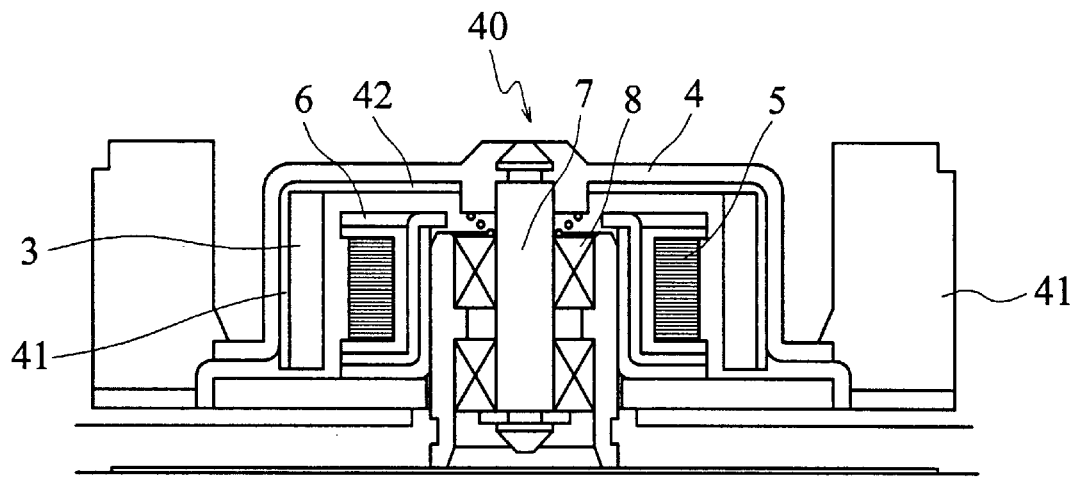
FIG. 4 is a schematic view showing a conventional combination of a rotor structure and a stator.

FIG. 3 is a schematic view of a rotor balance structure in accordance with the third embodiment of the present invention. The difference between this embodiment and that shown in FIG. 1 is in that the magnetically conductive plate 32 and the shaft 7 perpendicular to the central portion of the rotor are integrally formed.

In this embodiment, the magnetically conductive plate 32 and the rotor case 31 are separate, and thus, as in the previous embodiments, magnetically conductive plate 32 can be independently induced by the coil 5 on the stator so as to increase the magnetic force along the axial direction. The magnetically conductive plate 22, as in the first and second embodiments, can be made of any material that can be induced by the magnetic field of the coil 5 and create an attractive magnetic force, such as silicon steel or iron.

While the invention has been described by way of example and in terms of three preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A rotor balance structure, comprising:
   a vaned shell shaped as a cup with a plurality of blades circumferentially attached thereto;
   a rotor case shaped as a cup with an aperture formed on the flat portion thereof, said rotor case being mounted on the inner side of said vaned shell; and
   a magnetically conductive plate attached to the inner side of the flat portion of said vaned shell;
   wherein said magnetically conductive plate is provided in the aperture without contacting said rotor case.

2. The rotor balance structure of claim 1, wherein the magnetically conductive plate includes a plurality of silicon steel sheets.

3. The rotor balance structure of claim 1, wherein the magnetically conductive plate includes an iron sheet.

4. A rotor balance structure, comprising:
   a vaned shell shaped as a cup with a plurality of blades circumferentially attached thereto;
   a rotor case shaped as a cup with an aperture formed on the flat portion thereof, said rotor case being mounted on the inner side of said vaned shell;
   a magnetically conductive plate attached to the inner side of the flat portion of said vaned shell; and
   a shaft perpendicularly connected to the center of said vaned shell and integrally formed with said magnetically conductive plate;
   wherein said magnetically conductive plate is provided in the aperture without contacting said rotor case.

5. The rotor balance structure of claim 4, wherein the magnetically conductive plate includes a plurality of silicon steel sheets.

6. The rotor balance structure of claim 4, wherein the magnetically conductive plate includes an iron sheet.

7. A rotor balance structure, comprising:
   a vaned shell shaped as a cup with a plurality of blades circumferentially attached thereto;
   a rotor case shaped as a cup and mounted on the inner side of said vaned shell;
   a magnetically conductive plate placed on the inner side of the flat portion of said rotor case; and
   a non-magnetically conductive material inserted between said magnetically conductive plate and said rotor case.

8. The rotor balance structure of claim 7, wherein the non-magnetically conductive material includes plastic.

9. The rotor balance structure of claim 7, wherein the non-magnetically conductive material includes rubber.

10. The rotor balance structure of claim 7, wherein the magnetically conductive plate includes a plurality of silicon steel sheets.

11. The rotor balance structure of claim 7, wherein the magnetically conductive plate includes an iron sheet.

12. A rotor balance structure, coupling to a stator including a coil and a magnetic conduction silicon steel set, said rotor balance structure comprising:
   a vaned shell shaped as a cup with a plurality of blades circumferentially attached thereto;
   a rotor case shaped as a cup and installed on the inner side of the vaned shell; and
   a magnet installed on the inner side of the rotor case;
   wherein an aperture is formed on the flat portion of the rotor case and a magnetically conductive plate is installed on the inner side of the flat portion of the vaned shell in said aperture without contacting the rotor case, whereby said magnetically conductive plate is subject to the magnetic attraction of the coil so as to improve the rotational balance of said rotor balance structure.

13. A rotor balance structure, coupling to a stator including a coil and a magnetic conduction silicon steel set, said rotor balance structure comprising:
   a vaned shell shaped as a cup with a plurality of blades circumferentially attached thereto;
   a rotor case shaped as a cup and installed on the inner side of the vaned shell; and
   a magnet installed on the inner side of the rotor case;
   wherein an aperture is formed on the flat portion of the rotor case, a magnetically conductive plate is installed on the inner side of the flat portion of the vaned shell in said aperture without contacting the rotor case, and a shaft, formed integrally with said magnetically conductive plate, is perpendicularly connected to the center of the vaned shell, whereby said magnetically conductive plate is subject to the magnetic attraction of the coil so as to improve the rotational balance of said rotor balance structure.

14. A rotor balance structure, coupling to a stator including a coil and a magnetic conduction silicon steel set, said rotor balance structure comprising:

a vaned shell shaped as a cup with a plurality of blades circumferentially attached thereto;

a rotor case shaped as a cup and installed on the inner side of the vaned shell; and a magnet installed on the inner side of the rotor case;

wherein a magnetically conductive plate is placed on the inner side of the flat portion of the rotor case and a non-magnetically conductive material is inserted between said magnetically conductive plate and said rotor case, whereby said magnetically conductive plate is subject to the magnetic attraction of the coil so as to improve the rotational balance of said rotor balance structure.

15. The rotor balance structure of claim 14, wherein the non-magnetically conductive material includes plastic.

16. The rotor balance structure of claim 14, wherein the non-magnetically conductive material includes rubber.

\* \* \* \* \*